US008843437B2

(12) United States Patent
Buhl et al.

(10) Patent No.: US 8,843,437 B2
(45) Date of Patent: Sep. 23, 2014

(54) MEASUREMENT DATA MANAGEMENT WITH COMBINED FILE DATABASE AND RELATIONAL DATABASE

(75) Inventors: Hans-Joachim Buhl, Karlsruhe (DE); Daniel Kasselmann, Karlsruhe (DE); Henry Boehlert, Karlsruhe (DE); Leon Kopelev, Foster City, CA (US); Abdul Warres, Concord, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1781 days.

(21) Appl. No.: 11/975,256

(22) Filed: Oct. 18, 2007

(65) Prior Publication Data

US 2009/0106185 A1    Apr. 23, 2009

(51) Int. Cl.
 *G06F 7/00*  (2006.01)
 *G06F 17/00* (2006.01)
 *G06F 17/30* (2006.01)
 *G06Q 10/06* (2012.01)

(52) U.S. Cl.
 CPC .......... *G06F 17/30595* (2013.01); *G06Q 10/06* (2013.01)
 USPC ........... 707/610; 707/829; 707/802; 707/825; 707/830

(58) Field of Classification Search
 USPC ............. 707/100, 9, 102, 101, 202, 610, 802, 707/821, 954; 715/234
 See application file for complete search history.

(56) References Cited

U.S. PATENT DOCUMENTS

| | | | |
|---|---|---|---|
| 6,983,295 B1 * | 1/2006 | Hart | 707/610 |
| 7,069,502 B2 * | 6/2006 | Numata et al. | 715/234 |
| 7,461,077 B1 * | 12/2008 | Greenwood | 1/1 |
| 2004/0073565 A1 * | 4/2004 | Kaufman et al. | 707/101 |
| 2006/0089954 A1 * | 4/2006 | Anschutz | 707/202 |
| 2007/0067120 A1 | 3/2007 | Kasselmann et al. | |
| 2007/0112808 A1 * | 5/2007 | Howard et al. | 707/100 |
| 2008/0033960 A1 * | 2/2008 | Banks et al. | 707/9 |

FOREIGN PATENT DOCUMENTS

| | | | | |
|---|---|---|---|---|
| EP | 1315358 A1 * | 5/2003 | | H04L 29/08 |
| EP | 1672872 A1 * | 6/2006 | | |

OTHER PUBLICATIONS

"Molecular Spectrometry Data Interchange Applications for NIST's SpectroML"; Anh Dao Thi Nguyen, Aykut Arslan, John Travis, Melody Smith, Reinhold Shafer, and Gary W. Kramer; Gaithersburg, MD; 2004.*

"Molecular Spectrometry Data Interchange Applications for NIST's SpectroML"; Anh Dao Thi Nguyen, Aykut Arslan, John Travis, Melody Smith, Reinhold Sharer, and Gary W. Kramer; Gaithersburg, MD; 2004.*

"An Automated Integration Approach for Semi-Structured and Structured Data"; Seung-JIng Lim, Yiu-Kai Ng; Provo, Utah; IEEE; 2001.*

* cited by examiner

*Primary Examiner* — Giovanna B Colan

(57) ABSTRACT

A device for managing a plurality of measurement data, each measurement data representing a value of a physical parameter, the device comprising a file database adapted for storing the plurality of measurement data in the form of data files each of which being assigned to a specific measurement, a relational database adapted for storing at least a part of the plurality of measurement data in the form of relational data being structured in accordance with individual measurement parameters assigned to different measurements, and a processing unit adapted for extracting the relational data from the data files.

22 Claims, 2 Drawing Sheets

MEASUREMENT DATA MANAGEMENT WITH COMBINED FILE DATABASE AND RELATIONAL DATABASE

BACKGROUND ART

The present invention relates to the management of measurement data.

Measurement instruments are applied to execute various measurement tasks in order to measure any kind of physical parameter. Each measurement instrument may have a specific driver with measurement instruments specific commands. A programming software implements interfaces to each measurement instrument and processes the measurement instruments specific information in order to communicate with the measurement instrument. As a result of a measurement, measurement data is output by the measurement instrument. Such measurement data may include values of physical parameters such as concentrations of components of a sample, intensity values of a fluorescence measurement, etc.

US 2007/0067120 discloses a data processing device (e.g. a computer or a software module) comprising a processor unit adapted to convert input data provided by a measurement device (e.g. experimental data acquired by means of a measurement device during a measurement) into output data provided in a unified data format (e.g. in a standardized normalized measurement-device-independent data representation format).

For the management of measurement data, a database may be provided including a number of files each related to a specific measurement. Each of the files may be accessible by an authorized user.

However, such a conventional data management system may be inconvenient in use.

DISCLOSURE

It is an object of the invention to provide a convenient data management system. The object is solved by the independent claims. Further embodiments are shown by the dependent claims.

According to an exemplary embodiment, a device for managing a plurality of measurement data is provided, each measurement data representing a value of a physical parameter (for instance a measured value or a test result), the device comprising a file database (for instance a first memory comprising files stored thereon) adapted for storing the plurality of measurement data in the form of data files each of which being assigned to a specific measurement, a relational database (for instance a second memory or a dedicated portion of the first memory comprising relational data stored thereon) adapted for storing at least a part of the plurality of measurement data in the form of relational data being structured in accordance with individual measurement parameters assigned to different measurements, and a processing unit (for example a processor providing data handling or computerization resources) adapted for extracting the relational data from the data files (for example restructuring, ordering and/or selecting data items included in the files).

According to another exemplary embodiment, a method of managing a plurality of measurement data is provided, each measurement data representing a value of a physical parameter, the method comprising storing the plurality of measurement data in the form of data files in a file database, each of the data files being assigned to a specific measurement, extracting relational data from the data files, and storing at least a part of the plurality of measurement data in the form of the relational data, being structured in accordance with individual measurement parameters assigned to different measurements, in a relational database.

According to still another exemplary embodiment of the present invention, a software program or product is provided, preferably stored on a data carrier, for controlling or executing the method having the above mentioned features, when run on a data processing system such as a computer.

Embodiments of the invention can be partly or entirely embodied or supported by one or more suitable software programs, which can be stored on or otherwise provided by any kind of data carrier, and which might be executed in or by any suitable data processing unit. Software programs or routines can be preferably applied in the context of measurement data management. The measurement data management scheme according to an embodiment of the invention can be performed or assisted by a computer program, i.e. by software, or by using one or more special electronic optimization circuits, i.e. in hardware, or in hybrid form, i.e. by means of software components and hardware components.

In the context of this application, the term "measurement data" may particularly denote experimental or analytical data derived by a measurement apparatus, for instance being indicative of a result of a test carried out on a device under test (DUT) or indicative of a result of a biochemical analysis of a substance under investigation. Such measurement data may comprise values of physical parameters such as temperature, concentrations, relative amounts of different substances in a mixture, etc.

The term "physical parameter" may particularly denote any parameter having a meaning or a relevance in the field of physics, for example data characterizing a substance or a sample. A physical parameter may be a direct property of a substance under analysis, or may be a parameter which indirectly characterizes an analysis of a substance, such as a fluorescence value indicative of a relative concentration of a fraction in a sample comprising multiple components to be separated.

The term "data file" may particularly denote a collection of stored information which may have a specific file name and which is accessible only as a whole. A file may therefore represent a document or an application that has been given a name and which is an unstructured conglomerate of data. In the context of this application, a file may be assigned to a specific measurement and may include all or a part of the data being characteristic for the measurement or a result thereof.

The term "relational data" may relate to data stored in a structured or ordered manner in a relational database, in a way to enable access to individual data items of the relational database. A relational database may be a database with a data structure based on a relational model. Thus, the term may refer to a specific collection of data with a linking scheme or an ordering scheme. It may denote a database in which relations between information items are explicitly specified as accessible attributes. For example, in a relational database the data may be organized as a number of differently sized tables. Therefore, a relational database may be a complex database which may use several tables that relate to each other. In the context of the application, the relational database may group corresponding data items of different measurements which have a corresponding content. For instance, a relational table may include a group of pressure values applied during different measurement cycles. In contrast to this, a file may relate to an assigned measurement, and may include pressure, temperature, intensity values, etc. which are assigned to a specific measurement.

According to an exemplary embodiment, data files may be received at an input, for instance from a user or from a measurement apparatus generating the measurement data. The measurement data for each measurement may be collected or provided in the form of a file. A collection of such files may be stored in the received form without editing in the file database, each file being accessible for a user only as a whole. However, in order to allow for an easy and intuitive access of a user to specific comparable items of information of the files, a processing unit such as a CPU (central processing unit) may transfer at least a part of the data contained in the data files to a relational database. For this purpose, a selective extraction of logically linked or coupled items of information from the different files belonging to each other or corresponding to each other are stored in the relational database with a specific relation to one another, for instance in the form of tables. Hence, a selective access to different items of information structured for the different measurements may be accessed by a user who may retrieve specific pieces of data, if desired in connection with a user-defined search profile, from the relational database.

Thus, exemplary embodiments may allow for a relational data integration in a document management system. The user may work on a logical database with two different descriptions: Unstructured data files and structured standardized relations. By the integration of a relational standardized data mapping in a document management system, the context and the synchronization between the file documents as well as the relational standardized data extracted therefrom remain in the system. Thus, exemplary embodiments may allow to use complex use data and meta data in a hybrid manner: In a document centric manner as a data file, and additionally in a relational standardized and document comprehensive data model.

For example, it is possible that data documents with analytical data are introduced in the document management system by a ChemStation Client of Agilent Technologies. It is possible to access these data files with a ChemStation Client at any time, for instance to modify the analytical data or to generate data versions in the document management system and to perform revisions of the data in the relational model. Simultaneously, it may be also possible to carry out complex evaluations on the basis of the relational description. In this scenario, it is not necessary to access the data file, but it is possible to access specific result sets such as sequences, samples or injections.

Next, further exemplary embodiments of the device will be explained. However, these embodiments also apply to the method and to the software program or product.

The file database may be adapted for storing the measurement data in the form of the data files without any hierarchy between the data files. Thus, each of the data files may be considered individual and there is no dependency or correlation between different data files. Each data file may be assigned to a specific measurement.

The relational database may be adapted for storing the measurement data in the form of relational data being hierarchically structured. Therefore, links, a correlation, a relation or a hierarchy between the different information items may be present in the relational database. Thus, the data items are linked or structured so as to allow a user to make use of the correlations or interdependencies of the data items.

The processing unit may be adapted for generating the relational data by structuring a content of the data files. Thus, individual information items included or encoded in the data files at specific portions or in a specific computer-readable language may be extracted by the processing unit (which may be capable of interpreting files in pre-known formats) in order to generate meaningful dependencies between different information items in the relational database.

The processing unit may be adapted for generating the relational data by structuring the content of the data files in such a manner that individual items of the measurement data are accessible via the relational data which items are not individually accessible via the data files. For example, a specific measurement parameter such as a concentration value or a temperature value may be ordered by the processing unit in a tabular manner so as to provide easy and intuitive access of a human user to this data.

The processing unit may be adapted for generating the relational data by inserting relations between individual items of the data files. Thus, one data item may point to another data item so that correlations between the individual data items are easily searchable or retrievable by search routines or search schemes which may be defined by a user being interested in a specific sub-portion of the data stored in the data files.

The processing unit may be adapted for generating the relational data by structuring the files in table form. A table may be a description of data content with rows and columns, wherein different tables or table portions may be linked to other tables or table portions so as to link correlated data. For example, different tables may include information of different measurements regarding a specific aspect or parameter.

At least a part of the measurement data may be redundantly stored in the file database and in the relational database. Thus, one and the same data item may be stored twice for easy access of a user, namely in the data file together with other measurement parameters of a specific measurement, and in the relational database for instance to enable a comparison of a specific aspects in different measurements.

At least a part of the measurement data may be stored only in the file database and not in the relational database, and reference may be made in the relational database to the part of the measurement data stored only in the file database. Thus, redundant storage of one and the same information in both the file database and the relational database may be avoided by simply involving links between the file database and the relational database. Thus, the required storage capacity may be significantly reduced.

The processing unit may be adapted for generating the relational data based on the data files directly after receipt of the relational data. Therefore, the conversion or extraction mechanism may be performed essentially in real time and may be triggered each time a new file is added to the file database so that no backlog of information to be processed remains in the device. Consequently, directly after having provided new file data of a measurement into the system, the user may use both, the file description and the relational description. Thus, according to an exemplary embodiment, the structuring may be performed essentially in real time. It is possible to extract the information items from the files directly after receipt of each file.

Alternatively, the processing unit may be adapted for generating the relational data based on the data files after receipt and buffer storage of the relational data with a delay depending on the actual computational burden. Therefore, in a scenario in which the actual computational burden is high and the system is busy, the data introduced in the system may be stored in a buffer storage (such as a ring buffer) and may be used for extraction of relational data as soon as the computational burden has decreased, for instance has fallen below a threshold level. Thus, a loss of data may be securely prevented even in a scenario in which the computational burden is high. With such an architecture, the processing and storage resources may be used very efficiently. Thus, the restructuring may be performed not in real time, but in dependency of the load or computational burden on a server. In the latter embodiment, it is possible to buffer the content of the files in a buffer storage unit and to extract them later when the processing capability has become larger again.

The processing unit may be adapted for synchronizing the relational data with the data files. Therefore, it may be ensured that there is always a synchronized storage of the relational data with the data files so that no discrepancy between the data derivable from the relational database or from the file database occurs.

The device may comprise a data file interface adapted for receiving the measurement data. Such a data file interface may be an input interface (for instance a graphical user interface) via which the data files may be provided to the system, for instance by a user via a storage medium such as a USB stick or a CD on which the data is stored, or directly from a coupled measurement device such as a ChemStation.

The data file interface may be adapted for receiving the measurement data in a unified data format. Such a unified data format may be a standardized normalized measurement device independent data representation format which makes it easy for the processing unit to extract the information relevant for the relational database from such a unified data file.

The unified data format may be based on the Extensible Markup Language (XML). XML may be considered as a simplified subset of SGML, capable of describing many different kinds of data. A purpose is to facilitate the sharing of structure text and information. Language is based on XML (for instance RDF, RFS, MathML, XSIL and SVG) are themselves described in a formal way, allowing programs to modify and validate which documents in these languages without prior knowledge of their form. XML is an example for unified data format which has become a quasi industrial standard due to the extensive use of XML in many fields.

For instance, the unified data format may be based on the Extensible Markup Language (XML). XML may be considered as a simplified subset of SGML, capable of describing many different kinds of data. A purpose is to facilitate the sharing of structured text and information. Languages based on XML (for example RDF, RSS, MathML, XSIL and SVG) are themselves described in a formal way, allowing programs to modify and validate documents in these languages without prior knowledge of their form. XML is an example for a unified data format which has become a quasi industrial standard due to the extensive use of XML in many fields.

The data file interface may be adapted for a communicative connection to a measurement device providing the measurement data. Thus, the data file interface may be directly coupled (in a wireless or wired manner) to a machine which provides the results of the data in real time to the system.

The data file interface may be adapted for a bidirectional communicative connection to a communicatively connected entity for exchanging the measurement data in the form of the data files. Such a connected entity may be a human being or a machine.

The data file interface may be an Application Programmer Interface (API). API may be denoted as a set of definitions of the ways one piece of computer software communicates with another. It may be denoted as a method of achieving abstraction, usually but not necessarily between lower level and higher level software.

The device may comprise a relational data interface adapted for providing access to the relational data. The relational data interface may be adapted for providing access to the relational data upon receipt of a query such as a Structured Query Language (SQL) query. Thus, in a standardized way, a user may get access to the relational data interface to make use of the logically linked data items, which may have unidirectional or bidirectional coupling schemes to indicate or characterize their coupling characteristics.

The relational data interface may be adapted for providing access to the relational data based on a role of a user providing a query. Thus, in dependence of a role such as an education, a level of skill, a ranking in a social hierarchy, a position in a company, etc., the data output properties (for instance the accessible content, the output format, etc.) may be adjusted accordingly. Thus, the data may be output in a format which considers the status of the user operating the device. Therefore, the data may be output in a user specific manner.

Alternatively, the relational data interface may be adapted for providing access to the relational data based on a domain to which a user belongs who provides a query. Such a domain may be a subgroup of a social network such as a research and development group of a company. Again, the data output characteristic may be adjusted to the user-specific requirements in such a domain.

The relational data interface may be adapted to provide a set of data items of the relational data in accordance with a query of a user. Thus, a user may define a search profile indicating or specifying the information which she or he desires to get from the relational database. The system may then perform a search in the relational database (optionally also in the file database) to derive specific information in accordance with a search profile.

The relational data interface may be adapted to provide the set of data items in at least one format of the group consisting of a reporting tool format, a proprietary file format, and a third party system file format. A reporting tool format may be a format in which a hardcopy (such as a printout) of the information may be performed. A proprietary file format may be a file format of a specific manufacturer or provider. A third party system file format may be a file format which is defined or created by a third party such as a client.

The relational data interface may comprise a View Layer. A View Layer may be denoted as a user interface such as a GUI (graphical user interface) via which a user may communicate with the system. Results of a query may be displayed graphically to a user.

The measurement device may be adapted to measure at least one physical, chemical, or biological parameter of an analyte under examination. Examples for such parameters are temperature, pressure, volume, a concentration, a pH value, the presence or absence of proteins or genes in a solution, a biological activity of a sample, or the like.

The measurement device may further comprise at least one of a sensor device, a test device for testing a device under test or a substance, a device for chemical, biological and/or pharmaceutical analysis, a fluid separation system adapted for separating components of a fluid, a capillary electrophoresis device, a liquid chromatography device, a gas chromatography device, an electric measurement device, and a mass spectroscopy device. Thus, exemplary application fields of a measurement device according to embodiments are gas chromatography, mass spectroscopy, UV spectroscopy, optical spectroscopy, IR spectroscopy, liquid chromatography, and capillary electrophoresis bioanalysis. More generally, the device according to embodiments may be integrated in an analysis device for chemical, biological and/or pharmaceutical analysis. Such an analysis system may be a fluid separation device, a liquid chromatography device, an electrophoresis system, or the like. In a realization of the apparatus is a device for chemical, biological and/or pharmaceutical analysis, functions like (protein) purification, electrophoresis investigation or solutions, fluid separation, or chromatography investigations may be realized by the analysis device. An example for a measurement device is an apparatus of the 1100 Series for liquid chromatography (LC) of Agilent Technologies.

Measurement curves may be provided to the system as a data set, including information which user performed which experiment at which date with which results. The entirety of this information may be stored in a file system as a file (such as a content management system) for example Enterprise Content Manager (ECM).

Particularly in the field of pharmacological development, it may be required by the FDA (Food and Drug Administration) that measurement data is stored continuously as received during a measurement to make such a system transparent. According to an exemplary embodiment, this requirement may be met by the file database, wherein the additional functionality of the relational database may simplify a user-friendly structured evaluation of the data.

In contrast to this, according to an exemplary embodiment, the measurement data is not only stored in a database as a file, but in parallel as data in a relational database, i.e. with relations between the individual items of information. Thus, exemplary embodiments may allow to combine the architecture of data files (in which the smallest separately retrievable unit is a file) with the architecture of relational data in which the content of the files is structured. In order to derive such relational data, a process may analyze the files regarding their content ("extraction") and may restructure the data (for instance to store the data redundantly in the form of tables).

According to an exemplary embodiment, each data item may be stored twice, namely in a file-based representation and in a relational representation. Additionally or alternatively, it is possible that at least a part of the data items are stored only once, namely within the files with the file database, and to include links or references between the data to logically couple the data between the file and the relational database.

The individual data files are downloadable from the file database. However, the flexibility and the comfort of downloading logical units or logical combinations of items of information is significantly better when downloading information from the relational database. For instance, it is possible to search in the relational database for search terms such as one or more "substances" or one or more "projects". This may allow for an aspect-oriented evaluation in a multidimensional data space. The description of the data may be better and faster.

It may be particularly advantageous when the data extracted by the system is already present in the so-called ACAML format, as disclosed in US 2007/0067120 which is incorporated by reference in its entirety into the disclosure of this application. ACAML may allow for a normalization of the data representation in which inner relations between data items are already defined (then, the conditioning, editing or preparation or formatting of the data is significantly simplified).

According to an exemplary embodiment, data may originate from different name spaces and may be transferred into a common name space in order to enable an absolute comparability of the data. For this purpose, an evaluation database process (or synchronizing unit) may have the capability to handle different data formats (which may be recognized on the basis of extensions of a file).

The files may be provided in a proprietary format (that is to say in a manufacture or application specific format which needs not be compatible with other formats). A format of the data in which format the data is stored in the relational database may also be proprietary (that is to say not necessarily understandable for clients), but a database viewer (abstraction layer) may be provided to make this language readable for a user. For this purpose, a conversion of the data may be performed, so that the data is understandable or readable or interpretable for a user via the database viewer.

The format output by the database viewer may be different for different users. For instance, such a format may be role-based (for instance different for research and development people on the one hand and a technically non-skilled user on the other hand). The difference between the database views may also be domain-based, for instance in correspondence with a domain to which a user belongs (for instance domain "everyday speech" or domain "technical terminology").

A synchronization service in such a system may include predefined rules allowing to interpret the proprietary data files which are difficult to compare. For example, the synchronization service may have access to a database allowing to interpret different manufacture-specific formats, which may be recognized by an extension of a data file or the like.

Therefore, exemplary embodiments may allow to obtain a searchable archive, for instance allowing to easily retrieve measurement data related to a charge of medication which has been defective.

According to an exemplary embodiment, measurement data may be stored in combination in a file and as relational data on the basis of one and the same data items. Particularly, the input formats may be proprietary, may be searchable/retrievable/queryable in a standardized manner, and may allow to be presented in a universal output.

An entity may be provided which allows the coupling of a file-based storage system to a relational database system. Such a system may be a real time system, i.e. a modification in the file system may immediately result in a modification in the relational database, so that both descriptions are always up to date.

BRIEF DESCRIPTION OF DRAWINGS

Other objects and many of the attendant advantages of embodiments of the present invention will be readily appreciated and become better understood by reference to the following more detailed description of embodiments in connection with the accompanied drawings. Features that are substantially or functionally equal or similar will be referred to by the same reference signs.

Figure 1:
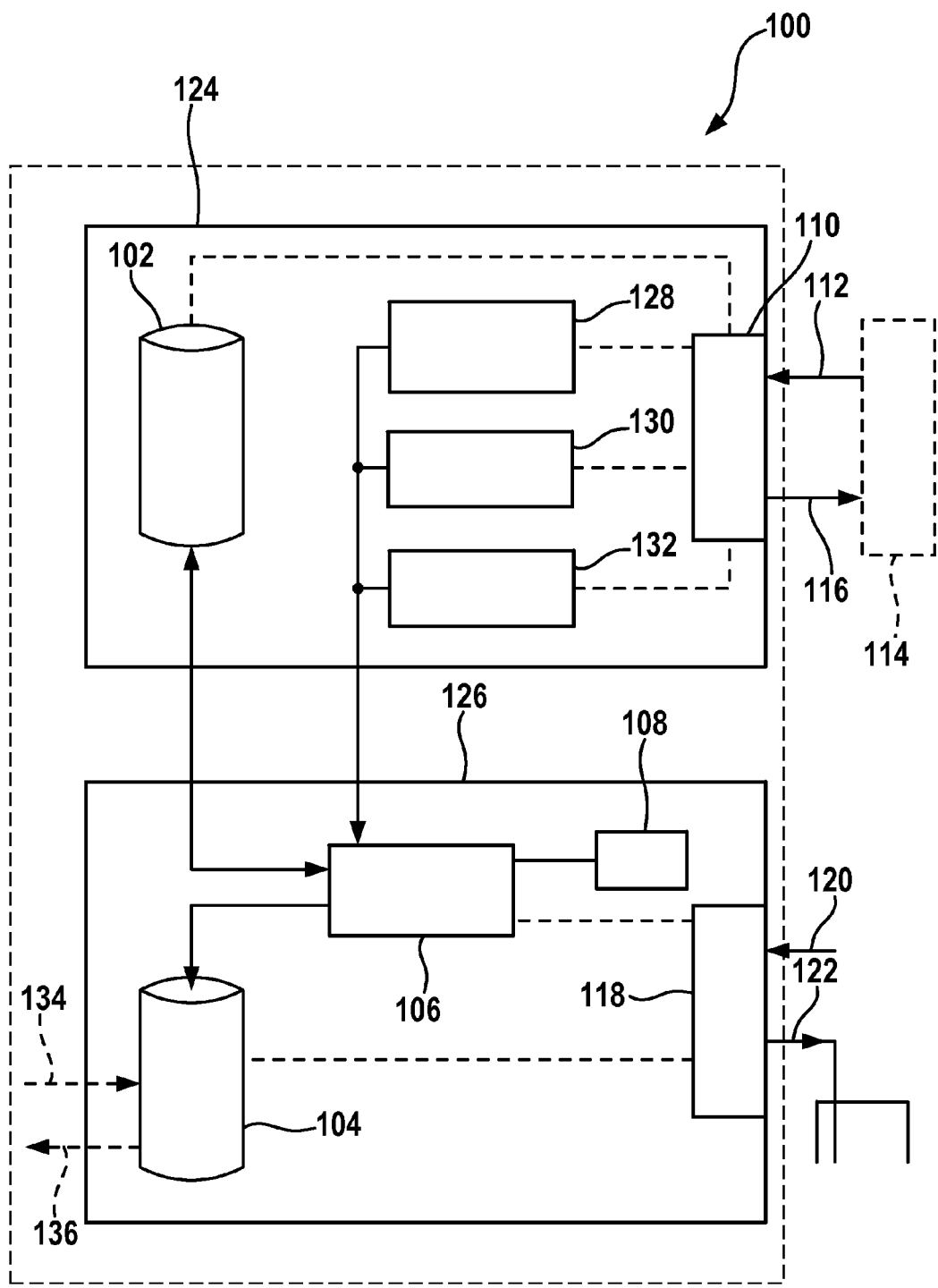
FIG. 1 shows a data management system according to an exemplary embodiment.

The illustration in the drawing is schematically.

In the following, referring to FIG. 1, a system 100 for managing a plurality of measurement data items, each measurement data item representing a value of a physical parameter related to a biochemical measurement, according to an exemplary embodiment will be explained.

The device 100 comprises a file database 102 adapted for storing the plurality of measurement data items in the form of data files each of which being assigned to a specific measurement and each having a specific file name. Moreover, the device 100 comprises a relational database 104 adapted for storing at least a part of the plurality of measurement data items in the form of relational data being structured in accordance with individual measurement parameters assigned to different measurements performed by one or more measurement apparatuses.

Thus, each file in the file database 102 includes all information and data generated in connection with a biochemical measurement, for instance a liquid chromatography measurement. Thus, when accessing a file in the file database 102, the user receives file, i.e. one set of information in an unstructured manner which includes all individual items of information obtained during such one specific measurement.

In contrast to this, in the relational database 104, the content of the data files stored in the file database 102 is structured in such a manner that corresponding parameters (for instance partial amounts of individual components of a substance separated by a liquid chromatography procedure) may be compared for different measurements. For example, percentages of a component X in different measurements may be retrieved, since this information is stored in an inter-measurement comparable manner in the relational database 104.

A synchronization service unit 106 is provided which has processing capabilities and which is adapted for extracting the relational data stored in the relational database 104 from the data files stored in the file database 102. In other words, the synchronization service unit 106 analyses the content of the files 102 and specifically extracts the individual items of information from the file database 102 for storage in the relational database 104. The restructuring of the data units performed by the synchronization service unit 106 may then allow for an aspect-oriented search in the relational database 104 to compare corresponding values of different measurements.

Thus, the synchronization service unit 106 generates the relational data by structuring the content of the data files in a manner that individual items of the measurement data are accessible via the relational data which items are not individually accessible via the data files. Thus, the synchronization service unit 106 may insert relations or links between individual items of the data files when generating the relational data stored in the relational database 104. In the relational database 104, the data may be stored in a table form, with correlations between individual items of the table components. At least a part of the measurement data may be stored redundantly in the file database (within a file) and in the relational database 104 (as an individual item). Alternatively, it is also possible that the relational database does not redundantly store these items of information but simply includes a reference to a memory address in the file database 102 where the corresponding item of information is stored.

Directly after receipt of new measurement data at an interface 110, which will be described below in more detail, the synchronization service unit 106 may receive a trigger signal triggering retrieval or extraction of the individual items of information from the new files stored in the file database. However, when the synchronization service unit 106 presently faces a high computational burden, it is possible that the corresponding information is stored in a buffer storage unit 108 until the processing capabilities of the synchronization service unit 106 are again available.

An Application Programmer Interface (API) unit 110 is provided as a data file interface adapted for receiving the measurement data via an input interface 112 from a measurement system 114, for instance a ChemStation. The measurement data may be provided in a unified data format at the input interface 112. This unified data format may be Agilent Common Analytical Markup Language, as disclosed for instance in US 2007/0067120 A1. As an alternative to an automatic measurement system 114, the data may be input by a user manually or via the provision of a storage unit such as a CD or a USB stick coupled via the input interface 112 to the system 100.

Via an output interface 116, it is possible that the measurement system 114 or a user gets access to the files stored in the file database 102, for instance to download a complete file.

Furthermore, a View Layer 118 may be provided as a relational data interface adapted for providing access to relational data stored in the relational database 104 upon receipt of a corresponding query. For this purpose, the View Layer 118 comprises a query interface 120 adapted for receiving an SQL query from a user specifying a specific search term of information stored in the relational database 104. The View Layer 118 may then retrieve the desired data from the relational database 104 and may output this data in a row-specific or domain-specific manner to an output interface 122. The kind of output of the information at the output interface 122 may be a reporting tool format (for instance a paper print out of the desired information), may be a proprietary file format (for instance an Excel file), or may be any third party system file format, for example ERP (Enterprise Resource Planning).

The system 100 allows a relational data integration in a document management system. The system 100 comprises a file-based storage portion 124 and a relational data storage portion 126. File-based applications from a measurement device 114 may be supplied to the file-based storage portion 124 via the interface 112. In the file database 102 and in the relational database 102, the same data is stored in different representations.

In the file-based storage portion 124, the Application Programmer Interface 110 is coupled for data communication with the file database 102. Furthermore, the API interface 110 is communicatively coupled to a background storage unit 128, an indexer unit 130 and a filter unit 132. Units 128, 130, 132 may also communicate for data communication with the synchronization service unit 106.

Moreover, bidirectional data communication is possible between the file database 102 and the synchronization service unit 106. The synchronization service unit 106 is also coupled for data communication with the relational database 104 which, in turn, is coupled to the View Layer 118. The View Layer 118 is further coupled for data communication with the synchronization service unit 106.

The files provided by the interface 102 may be in a proprietary format, or may be in an ACAML format. The files may be provided by a measurement system such as ChemStation, OpenLAB, ECM, etc. The background storage unit 128 may store the files.

The file-based storage portion unit 124 is a document centric system (ECM), whereas the relational data storage portion unit 126 is a data centric system. The synchronization service unit 106 may extract, interpret, restore, delete components in the databases 102 and 104 and may have the capability of interpreting the files, for instance may have the capability of interpreting ACAML.

As further indicated in FIG. 1, it is also possible to directly access the relational database 104 via an SQL query providable via an SQL interface 134 and to receive an SQL response via an output interface 136. Therefore, it is optionally possible to have a direct SQL access to the relational database 104 for writing or reading data into or from the relational database 104.

Via the input interface 120, a standardized database query language may be used, for instance an SQL query. A record set may then be provided in accordance with the SQL query via the output interface 122.

Figure 2:
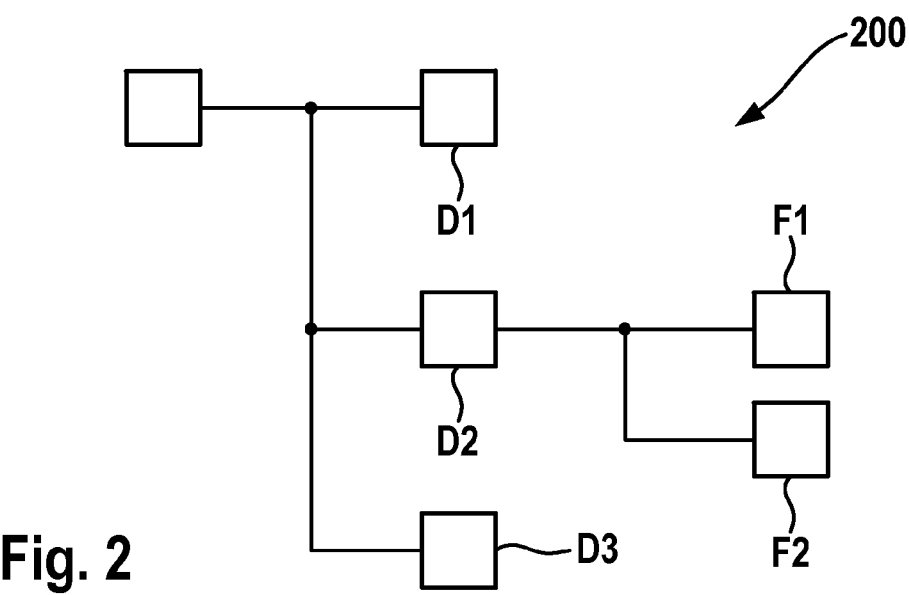
FIG. 2 shows a directory structure in a file based storage scheme.

FIG. 2 shows a directory structure 200 in a file-based storage scheme, for instance as stored in the file database 102. Different directories D1, D2 and D3 are provided, and individual files F1, F2 are stored in the specific directories, in the present embodiment only two files in directory D2. Thus, each file F1, F2 has a dedicated file name and is the smallest separately accessible data structure in the data file storage scheme 200.

Figure 3:
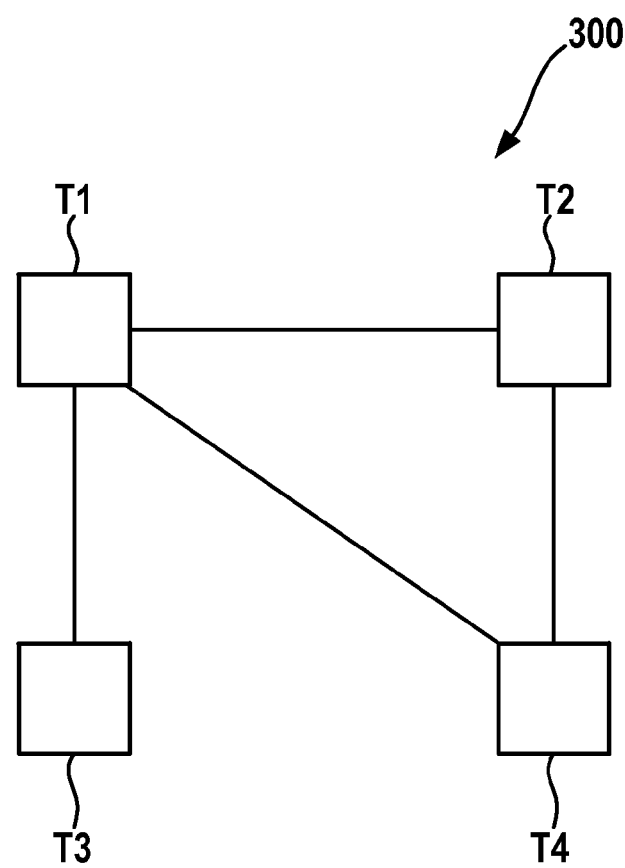
FIG. 3 shows a data structure in a relational storage scheme.

FIG. 3 shows a data structure in a relational storage scheme, for instance as stored in the relational database 104. In this scheme 300, various tables T1, T2, T3 and T4 are shown comprising the data included in the files F1, F2 in a structured manner. Individual data items may be extracted from each of the tables T1 to T4 by corresponding queries.

It should be noted that the term "comprising" does not exclude other elements or features and the "a" or "an" does not exclude a plurality. Also elements described in association with different embodiments may be combined. It should also be noted that reference signs in the claims shall not be construed as limiting the scope of the claims.

What is claimed is:

1. A device for managing a plurality of measurement data, each measurement data representing a value of a physical parameter, the device comprising
    a file database configured for storing the plurality of measurement data in the form of data files each of which being assigned to a specific measurement;
    a relational database configured for storing at least a part of the plurality of measurement data in the form of relational data being structured in accordance with individual measurement parameters assigned to different measurements;
    a processing unit configured for generating the relational data from the data files by structuring a content of the data files in such a manner that individual items of the measurement data are accessible via the relational data, the items not being individually accessible via the data files, wherein at least a part of the measurement data is stored only in the file database and not in the relational database, and reference is made in the relational database to at least a part of the part of the measurement data stored only in the file database.

2. The device of claim 1, wherein the file database is configured for storing the measurement data in the form of the data files without any hierarchy between the data files.

3. The device of claim 1, wherein the relational database is configured for storing the measurement data in the form of relational data being hierarchically structured.

4. The device of claim 1, wherein the processing unit is configured for generating the relational data by structuring a content of the data files.

5. The device of claim 1, wherein the processing unit is configured for generating the relational data by inserting relations between individual items of the data files.

6. The device of claim 1, wherein the processing unit is configured for generating the relational data by structuring the data files in table form.

7. The device of claim 1, wherein at least a part of the measurement data is redundantly stored in the file database and in the relational database.

8. The device of claim 1, wherein the processing unit is configured for generating the relational data based on the data files directly after receipt of the measurement data.

9. The device of claim 1, wherein the processing unit is configured for generating the relational data based on the data files after receipt and buffered storage of the measurement data with a delay depending on an actual computational burden.

10. The device of claim 1, comprising a data file interface configured for receiving the measurement data.

11. The device of claim 10, wherein the data file interface is configured for receiving the measurement data in the form of the data files.

12. The device of claim 10, wherein the data file interface is configured for receiving the measurement data in a unified data format.

13. The device of claim 10, wherein:
    the unified data format is based on the Extensible Markup Language; and/or
    the unified data format is based on the Agilent Common Analytical Markup Language.

14. The device of claim 10, wherein:
    the data file interface is configured for a communicative connection to a measurement device providing the measurement data; and/or
    the data file interface is configured for a bidirectional communicative connection to a communicatively connected entity for exchanging the measurement data in the form of the data files.

15. The device of claim 1, further comprising a relational data interface configured for providing access to the relational data.

16. The device of claim 14, wherein:
    the relational data interface is configured for providing access to the relational data upon receipt of a query; and/or
    the relational data interface is configured for providing access to the relational data upon receipt of a Structured Query Language query; and/or
    the relational data interface is configured for providing access to the relational data according to an access mode which is adjusted based on a role of a user providing a query; and/or
    the relational data interface is configured for providing access to the relational data according to an access mode which is adjusted based on a domain to which a user belongs who provides a query; and/or
    the relational data interface comprises a View Layer.

17. The device of claim 15, wherein the relational data interface is configured for provide a set of data items of the relational data in accordance with a query of a user.

18. The device of claim 17, wherein the relational data interface is configured for provide the set of data items in at least one form at of the group consisting of a reporting tool format, a proprietary file format, and a third party system file format.

19. The device of claim 1, wherein:
    the measurement data comprises at least one physical, chemical, and/or biological parameter of an analyte under examination; and/or
    the measurement data is provided by a measurement device which comprises at least one of a sensor device, a test device for testing a device under test or a substance, a device for chemical, biological and/or pharmaceutical analysis, a fluid separation system configured for separating compounds of a fluid, a capillary electrophoresis device, a liquid chromatography device, a gas chromatography device, an electronic measurement device, and a mass spectroscopy device.

20. A method of managing a plurality of measurement data, each measurement data representing a value of a physical parameter, the method comprising
- storing the plurality of measurement data in the form of data files in a file database, each of the data files being assigned to a specific measurement;
- generating relational data from the data files by structuring a content of the data files in such a manner that individual items of the measurement data are accessible via a relational data, the items not being individually accessible via the data files; and
- storing at least a part of the plurality of measurement data in the form of the relational data, being structured in accordance with individual measurement parameters assigned to different measurements, in a relational database;
- wherein at least a part of the measurement data is stored only in the file database and not in the relational database, and reference is made in the relational database to at least a part of the part of the measurement data stored only in the file database.

21. A software program or product, stored on a non-transitory data carrier, for controlling or executing the method of claim 20, when run on a data processing system.

22. The device of claim 14, wherein the data file interface is an Application Programmer Interface.

* * * * *